Oct. 28, 1941.  M. E. COLLINS  2,260,702
ILLUMINATION DETERMINING SYSTEM
Filed April 14, 1939
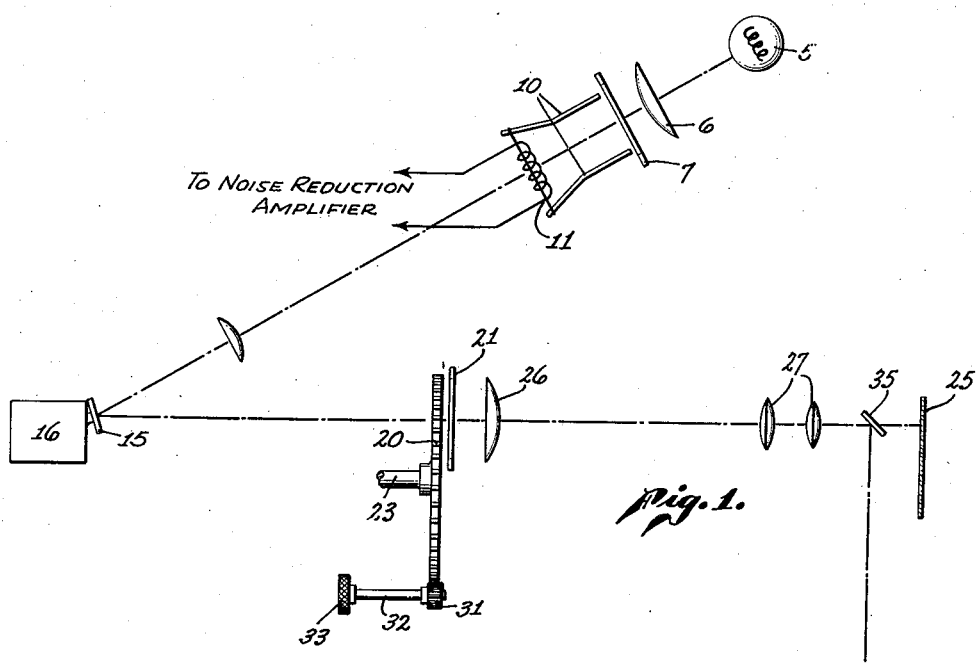
Fig. 1.
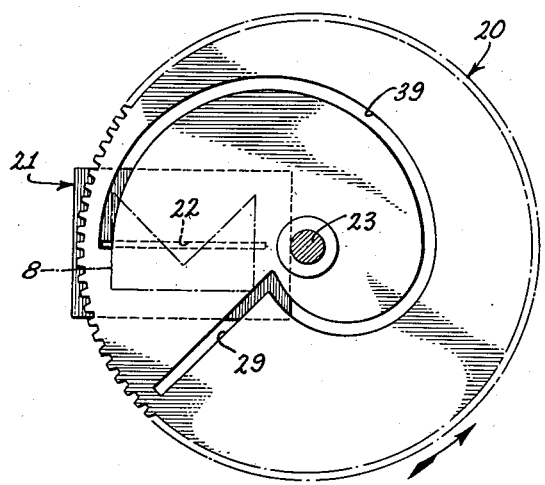
Fig. 2.
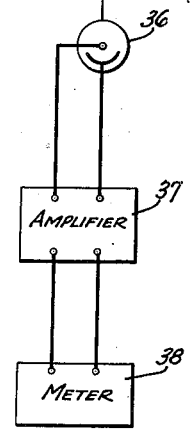
Inventor
MILFORD E. COLLINS,
By Val R. Goshaw
Attorney Patented Oct. 28, 1941

2,260,702

UNITED STATES PATENT OFFICE 2,260,702

ILLUMINATION DETERMINING SYSTEM

Milford E. Collins, Los Angeles, Calif., assignor to Radio Corporation of America, a corporation of Delaware Application April 14, 1939, Serial No. 267,945

6 Claims. (Cl. 179—100.3)

This invention relates to sound recording systems and particularly to a monitoring system for determining the uniformity of the illumination of a cross-section of a light beam.

In the variable area type of sound recording system, the light is pre-formed into a definite shaped light beam and then projected upon a second light beam forming means, such as an elongated slit in a mask, from which it is projected to a film. The elongated slit passes light in accordance with the shape of the beam as first formed, and in accordance with the movements of the beam caused by the sound waves being recorded. In systems of this type, the elongated slit is imaged or focused upon the film, the length of the beam passing through the slit being determined by the amplitude of the sound waves.

The light beam is generally produced by a light source such as a lamp with a heated filament. The lamp filament is adjusted with respect to the axis of the optical system transmitting the light to the film so as to produce a uniform light intensity along the length of the slit. Should there be any variation in intensity of the beam, different degrees of opacities would be produced in the final print which is, of course, undesirable.

In variable density systems, a narrow light beam forming means is also employed in the form of an elongated slit, as is well known in the art. In this case, although the length of the light beam striking the film remains constant and only the intensity of the beam is varied, it is necessary, for optimum results, to have the light beam uniform throughout its length. Thus, it is also desirable to be able to determine the uniformity of intensity of the beam for variable density systems. The present invention is directed to a method of and apparatus for measuring or determining the uniformity or non-uniformity of the illumination or light intensity along the length of a narrow light beam.

An object of the invention, therefore, is to measure the illumination or light intensity throughout the cross-section of a light beam.

Another object of the invention is to determine the variations in light intensity in the cross-section of a light beam.

A further object of the invention is to facilitate the measurement or determination of the uniformity or non-uniformity of a light beam.

A further object of the invention is to provide a light measuring system for a sound recording light beam to aid in the adjustment of the light beam optical apparatus.

Although the novel features which are believed to be characteristic of this invention are pointed out with particularity in the claims appended herewith, the manner of its organization and the mode of its operation will be better understood by referring to the accompanying drawing forming a part thereof, in which Figure 1 is a diagrammatic arrangement of a variable area sound recording system embodying the invention; and Figure 2 is a plan view of the measuring mask used in Fig. 1.

Referring now to Fig. 1, light from a source 5 of the filament type is collected by a lens 6 and projected on a mask 7 having an M-type aperture therein for producing the standard duplex variable area type of record. The shape of the light beam passing the aperture is shown by the dotted lines 8 in Fig. 2. The ends of the light beam are modulated by a pair of shutters 10 actuated by a coil 11, upon which is impressed rectified current from a noise reduction amplifier, as is well known in the art and disclosed in U. S. Patents 2,102,776; 2,102,777 and 2,102,778. The beam of light passing the mask 7 and shutters 10 is projected on the mirror 15 of a galvanometer 16, from which it is reflected to a spiral apertured mask 20 positioned directly in front of a mask 21 having an elongated slit 22 therein (see Fig. 2). Light passing the slit 22 is normally projected to a film 25 by a series of lenses 26 and 27.

The mask 20 is circular in form, rotatable on shaft 23, and has gear teeth on its circumference adapted to mesh with a spur gear 31 on shaft 32, the shaft 32 having a knurled finger knob 33. This apparatus may be mounted and made rotatable in any other suitable manner such as by a belt arrangement.

Referring to the remaining portion of Fig. 1, it will be observed that a 45°-angle deflector 35 is shown between the lenses 27 and the film 25 for deflecting the light to a photoelectric cell 36, the output of the cell being fed to an amplifier 37 connected to a meter 38. The position of the deflector 35 with respect to the cell 36 is such that a variable density image is projected on the cell 36 so that the light beam falling on cell 36 caused by varying lengths of the beam passing the slit 22, changes only in intensity but not in size.

In Fig. 2, the mask 20 is shown with a spiral aperture 39, and a straight aperture 29. Rotation of this mask will differentiate the light beam across the slit 22 during a 360° rotation of the mask 20. Thus, in order to determine whether or not the light passing the slit 22 is uniform in intensity across the slit, it is only necessary to insert the deflector 35 in the light beam, as shown, and rotate the mask 20, 360°. If the reading of meter 37 remains constant during the 360° rotation of the mask 20, then there is a uniform illumination or uniform light intensity across the slit 22. Should there be a variation, however, in the meter reading, as the mask is rotated, this variation indicates a non-uniformity of slit illumination. Since the same area of the cell 36 is at all times activated by the light passing through any particular portion of the slit 22, any variation caused at the meter 38 must be due solely to varying light intensities across the slit. Also the measurement may be completed very rapidly which will avoid any error likely to be caused by changes at the light source.

The mask 20 may be permanently attached to the sound recorder, sound reproducer or like apparatus because of the straight aperture 29 therein, this aperture being positioned in the optical path coinciding with the slit 22 during normal operation of the apparatus. The mask 20 may also be placed at other positions in the light path as long as the spiral aperture 39 differentiates the beam passing through the slit. The present system, therefore, provides an efficacious method of and means for quickly determining uniformity of slit illumination and is as applicable to variable density as to the variable area system described above.

I claim as my invention:

1. In sound picture apparatus, the combination of a light source, means for forming the light from said source into a beam of predetermined-shape, and means having a constant width continuous spiral slot for continuously measuring the light intensity progressively along said light beam in equal overlapping increments.

2. In sound picture apparatus, the combination of a light source, means for forming the light from said source into a beam of a certain shape, means for measuring light intensity, means having a constant width continuous spiral slot for progressively and continuously selecting overlapping equal sized portions of a predetermined cross-sectional area of said beam for intensity measurement, and means for impressing said selected portions on said measuring means.

3. In sound picture apparatus, a source of light, means for forming said light into a definite-shaped beam, means for normally projecting said beam to a motion picture film, means for measuring light intensity, and means for progressively and continuously projecting to said light intensity measuring means equal overlapping increments of said light beam of equal size, said last-mentioned means projecting all of said light beam to said light intensity measuring means at one position thereof.

4. In sound apparatus, a source of light, means for forming said light into a narrow elongated beam, means for measuring the intensity of the light in said beam, and means positioned in said beam for selecting equal-sized portions of said beam for impression on said measuring means, said portions being continuously selected progressively along the length of said beam in increments smaller than the width of said portions, said last-mentioned means being adapted to impress all of said beam on said intensity measuring means at one position of said last-mentioned means.

5. In sound apparatus, a source of light, means for forming said light into a narrow elongated beam, means for measuring the intensity of the light in said beam, and means positioned in said beam for selecting equal-sized portions of said beam for impression on said measuring means, said portions being continuously selected progressively along the length of said beam in increments smaller than the width of said portions, said last-mentioned means comprising a rotatable disc having a continuous spiral slot of constant width adapted to explore said beam within 360° of rotation of said disc, said disc having a straight slot adapted to pass said entire beam when said disc is in one certain position.

6. In a system for determining the uniformity of intensity of a narrow elongated light beam, the combination of a light source, a light measuring device, and a rotatable disc positioned in said beam and having a constant width continuous spiral slot adapted to explore all of said beam in equal-sized portions within one revolution of said disc, the end of said spiral slot being connected by a straight slot adapted to pass all of said beam simultaneously when said disc is in one certain position.

MILFORD E. COLLINS.